United States Patent Office 2,978,380
Patented Apr. 4, 1961

2,978,380

PROCESS FOR OBTAINING SEPARATELY SPIRAMYCIN I, SPIRAMYCIN II, AND SPIRAMYCIN III

Jean Preud'homme and Yvan Charpentie, Paris, France, assignors to Societe des Usines Chimiques Rhone-Poulenc, Paris, France, a corporation of France No Drawing. Original application Jan. 12, 1956, Ser. No. 558,609. Divided and this application Sept. 9, 1957, Ser. No. 682,615

Claims priority, application France Nov. 30, 1955

1 Claim. (Cl. 167—65)

The present invention relates to the preparation of new antibiotics and salts thereof.

A new antibiotic spiramycin is described in the publication Antibiotics Annual 1954–55, pages 724–727, published February 20, 1955, by Medical Encylcopedia Inc., New York city. This antibiotic is produced by fermentation of the streptomyces strain S-3486 (NRRL No. 2420). This material is actually a mixture of three different constituents of very similar chemical composition the existence of which was analytically revealed by counter-current distribution by means of a Craig apparatus, using cyclohexane and an aqueous spiramycin solution containing 1% of disodium phosphate. It has now been found that these constituents, which will hereinafter be called spiramycins I, II and III respectively, can be separated in the pure state and the present invention relates to the preparation of the pure constituents and to the preparation of mixtures of spiramycins II and III to the substantial exclusion of spiramycin I.

The main physical characteristics of spiramycins I, II and III are set out in detail in our prior co-pending Preud'homme et al. U.S. application Serial No. 558,609, filed January 12, 1956, of which this is a division.

According to the present invention a process for the separation of the said constituents from spiramycin comprises subjecting a solution of spiramycin to chromatography on alumina. More particularly, according to the present invention, there is provided a process for obtaining separately spiramycin I, being a substance having the approximate empirical formula $C_{46-48}H_{79-83}O_{16-17}N_2$, containing approximately 60.3% by weight carbon, 8.7% by weight hydrogen, 28.5% by weight oxygen and 3.2% by weight nitrogen, a melting point of 134–137° C. as determined on the Maquenne block, $[\alpha]_D^{20}=-96°$ (c.=1% methanol), $-91°$ (c.=1% ethanol), and $-57°$ (c.=1% chloroform), $E_{1\,cm.}^{1\%}$ at 232 millimicrons = 322 spiramycin II, being a substance having the empirical formula $C_{46-48}H_{79-83}O_{15-16}N_2$, containing approximately 61.6% by weight carbon, 8.5% by weight hydrogen, 26.8% by weight oxygen and 3.1% by weight nitrogen, a melting point of 130–133° C. as determined on the Maquenne block, $[\alpha]_D^{20}=-86°$ (c.=1% methanol), $-80°$ (c.=1% ethanol), and $-55°$ (c.=1% chloroform), $E_{1\,cm.}^{1\%}$ at 232 millimicrons = 307 and spiramycin III, being a substance having the empirical formula $C_{46-48}H_{79-83}O_{15-16}N_2$ containing approximately 61% by weight carbon, 8.5% by weight hydrogen, 26.7% by weight oxygen and 3.0% by weight nitrogen, a melting point of 128–131° C. as determined on the Maquenne block, $[\alpha]_D^{20}=-83°$ (c.=1% methanol), $-79°$ (c.=1% ethanol) and $-50°$ (c.=1% chloroform), $E_{1\,cm.}^{1\%}$ at 232 millimicrons = 327 by treatment of a crude material containing the same, which comprises subjecting the said crude material in solution in an organic solvent, to chromatography on alumina.

If it is desired to separate spiramycin I from spiramycins II and III, it is advantageous to use a good solvent for spiramycins, such as an aromatic hydrocarbon (for example benzene) or ether. In this case, spiramycins II and III are separated from spiramycin I by elution by this same solvent. The spiramycin I remains on the column and is therefore washed out by a benzene-acetons or benzene-alcohol mixture or by alcohol or acetone.

For separtaing the spiramycin II from the spiramycin III, a less effective solvent for spiramycins is preferably employed, such as a mixture of cyclohexane and an aromatic hydrocarbon or a mixture of cyclohexane and ether. The elution by this same mixture gives fractions enriched in spiramycin III, while the spiramycin II remains on the column and can be washed out by ether and then by a mixture of ether and acetone.

On repeating these chromatographic operations, spiramycins I, II and III are obtained in the pure state. The bases are isolated from the fractions containing them by evaporation of the organic solvent, followed in the case of spiramycins II and III by crystallisation from an aromatic hydrocarbon solvent, such for example as benzene.

The starting material may be a crude spiramycin as obtained by the process of Ninet et al. application Serial No. 441,634, filed July 6, 1954, or may be a partially separated product obtained by fraction crystallisation.

Spiramycins I, II and III have substantially the same antibacterial spectrum and the same activity as the starting spiramycin.

The following example shows by way of non-limitative example how the invention can be carried into practice.

*Example I*

50 g. of crystallised mixture of spiramycins II and III prepared by the method of the aforesaid U.S. application Serial No. 558,609, and having the following composition:

| | Percent by weight |
|---|---|
| Spiramycin II | 56 |
| Spiramycin III | 44 | are dissolved in 450 cc. of a mixture of cyclohexane and ether (2:1 by volume) and the solution is chromatographed on an alumina column (weight of alumina: 600 g., diameter of the column: 35 mm.). The chromatograph is developed first by the same mixture of cyclohexane and ether and then successively by ether and by a mixture of ether and acetone (1:1 by volume).

The progress of the chromatography is summarised by the following table:

| No. of fractions | Composition of the solvent | Volume, cc. | Total dry Extract, g. | Composition |  |
|---|---|---|---|---|---|
| | | | | spiramycin II, percent | spiramycin III, percent |
| 1 | cyclohexane-ether (2:1 by vol.) | 2,000 | 0.1 | | |
| 2 | do | 200 | 1.5 | | |
| 3 | do | 100 | 6 | traces | 95 |
| 4 | do | 100 | 5 | 15 | 85 |
| 5 | do | 300 | 6 | 30 | 70 |
| 6 | do | 500 | 1.8 | 50 | 50 |
| 7 | do | 1,400 | 3 | 60 | 40 |
| 8 | ether | 500 | 0.9 | 70 | 30 |
| 9 | do | 500 | 4.7 | 80 | 20 |
| 10 | do | 500 | 2 | 80 | 20 |
| 11 | ether-acetone (1:1 by vol.) | 1,000 | 7 | 85 | 15 |
| 12 | do | 1,000 | 7.4 | 95 | traces |

The relative compositions were determined by chromatography on paper.

Fraction 3 is concentrated under reduced pressure and the residue is dried and thereafter dissolved in 12 cc. of benzene at boiling temperature, the solution is cooled to 10° C. and after 15 hours the crystals are centrifuged, washed with benzene and dried. The product is recrystallised under the same conditions. 4 g. of spiramycin III in the form of its crystallised base are thus obtained.

The treatment of fraction 12 under the same conditions, followed by crystallisation from benzene under the same conditions gives 5.8 g. of crystallised spiramycin II in the form of its base.

Characteristics of the products obtained:

|  | Spiramycin II | Spiramycin III |
| --- | --- | --- |
| M.P. on the Maquenne block | 120–132° C | 128–130° C. |
| $[\alpha]_D^{20}$ (c.=1% methanol) | −85° | −82°. |
| Ultra-violet spectrum (in solution in ethanol) $E_{1\,cm.}^{1\%}$ at 232 m$\mu$. | 305 | 325. |
| Chromatography on paper | a single product. | a single product. |
| Chromatography on paper Rf | 0.15 | 0.22. |

Example II 50 g. of spiramycin in the form of its crude base are dissolved in 500 cc. of benzene and the solution is chromatographed on a column containing 750 g. of alumina (diameter of the column: 40 mm.). After the passage of the benzene solution, the chromatograph is developed with benzene, which has the effect of washing out all the spiramycins II and III. A mixture of benzene and acetone (1:3 by volume) is thereafter used for the development, which has the effect of washing out the spiramycin I.

The progress of the chromatography is summarised by the following table:

| No. of fractions | Composition of the solvent | Volume, cc. | Total dry Extract, g. | Composition | | |
| --- | --- | --- | --- | --- | --- | --- |
|  |  |  |  | spiramycin I, percent | spiramycin II, percent | spiramycin III, percent |
| 1 | benzene | 800 | 5 | 10 | 30 | 60 |
| 2 | do | 500 | 9 | 10 | 35 | 55 |
| 3 | do | 500 | 7 | 20 | 40 | 40 |
| 4 | do | 500 | 2 | 50 | 30 | 20 |
| 5 | benzene-acetone (1:3 by volume). | 400 | 5 | 80 | 10 | 10 |
| 6 | do | 400 | 8 | 100 |  |  |
| 7 | do | 400 | 3 | 100 |  |  |
| 8 | do | 800 | 1 | 100 |  |  |

Fractions 6, 7 and 8 are collected and concentrated under reduced pressure and the base obtained is dried in a vacuum oven (40° C. for 20 hours at 1 mm.). The base thus prepared consists of spiramycin I having the following properties:

Melting point on the Maquenne block ____° C__ 133–134
$[\alpha]_D^{20}$ (c.=1% methanol) _____° C__  −94
Ultra-violet spectrum (in solution in ethanol)
 $E_{1\,cm.}^{1\%}$ at 232 m$\mu$ _____ 318

Chromatography on Whatman paper No. 1 impregnated with buffer solution ($Na_2HPO_4$, $12H_2O$ at a concentration of 23.8 g./l. at pH 9) with the light phase of the cyclohexane - methylisobutylketone - water system (85:15:25 volumes) as developer solution, using the descending technique with a 4-hour development at 25° C. shows after bioautography on a nutrient agar plate inoculated with B. subtilis the presence of a single product characterised by an Rf of 0.04.

By further chromatography of the mixture of bases of combined fractions 1 and 2, in accordance with the method indicated in Example I, it is possible to obtain bases II and III in the pure state in the form of crystallised products.

We claim:

A process for obtaining separately spiramycin I, spiramycin II and spiramycin III which comprises dissolving in benzene a crude material containing the same, passing the resultant benzene solution into an alumina column, developing the column with benzene until substantially all the spiramycins II and III have been eluted, collecting such eluates as a series of fractions A, further developing the column with a mixture of benzene and acetone until substantially all the spiramycin I has been eluted, collecting the eluate as a series of fractions B; concentrating fractions B to dryness, the residue being spiramycin I; concentrating fractions A to dryness, dissolving the residue in a mixture of cyclohexane and ether, passing the resultant solution into an alumina column, developing the column successively with a mixture of cyclohexane and diethyl ether, diethyl ether alone and a mixture of diethyl ether and acetone to obtain different fractions containing mixtures rich in spiramycin II on the one hand and rich in spiramycin III on the other, separately treating the said different fractions by concentrating them to dryness, dissolving the residues in, crystallising them from, and washing them in, benzene, and drying the resultant products which are spiramycin II and spiramycin III respectively.

References Cited in the file of this patent

Pinnert-Sindico et al.: Antibiotics Annual, 1954–55, pp. 724–727.

Sano et al.: J. Antibiotics, Ser. A, pp. 88–97, May 1954.

Baron: Handbook of Antibiotics, p. 266, 1950, Rheinhold, N.Y.

Zechmeister: Progress in Chromatography, 1938–47, pp. 24–26, Wiley, N.Y.